R. S. CARTER.
SHOCK ABSORBER.
APPLICATION FILED MAR. 18, 1916.
1,252,397.
Patented Jan. 8, 1918.
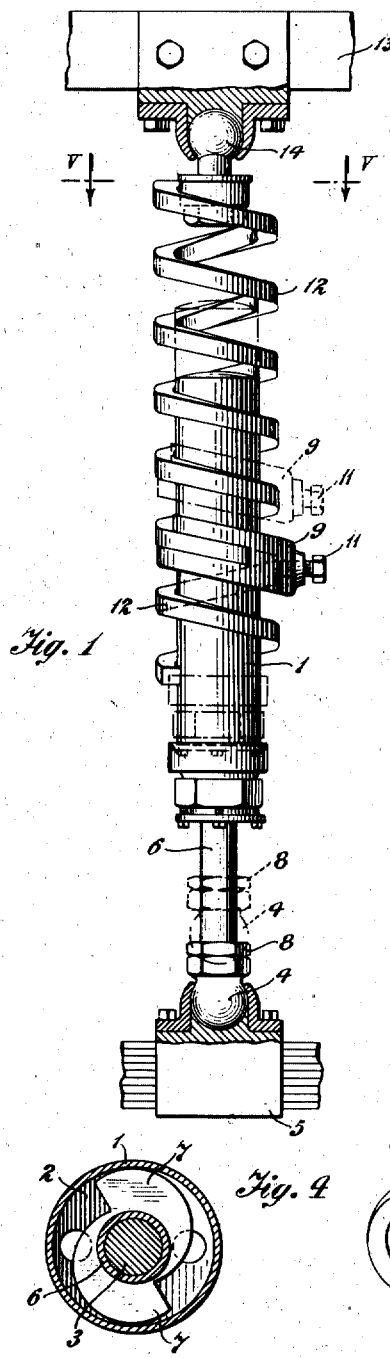
Fig. 1
Fig. 2
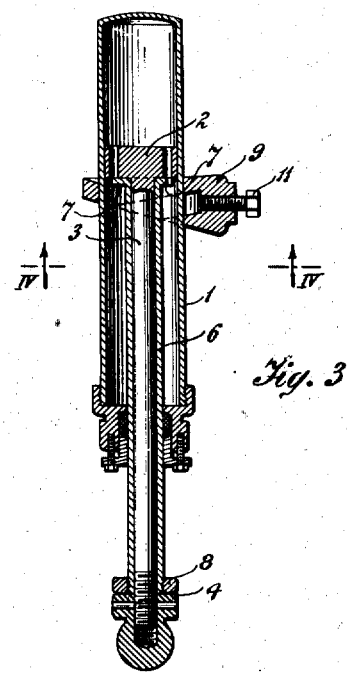
Fig. 3
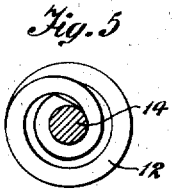
Fig. 4
Fig. 5
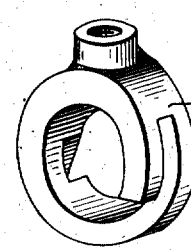
Fig. 6
Russell S. Carter, Inventor
By Attorney

UNITED STATES PATENT OFFICE.

RUSSELL S. CARTER, OF HEWLETT, NEW YORK.

SHOCK-ABSORBER.

1,252,397.

Specification of Letters Patent.

Patented Jan. 8, 1918.

Application filed March 18, 1916. Serial No. 85,188.

*To all whom it may concern:*

Be it known that I, RUSSELL S. CARTER, a citizen of the United States, residing at Hewlett, Long Island, in the county of Nassau and State of New York, have invented the following-described Improvements in Shock-Absorbers.

The invention consists in the special combination of a dash-pot and a spring, together forming the shock absorber, and adapted to be connected between the running-gear and frame of a vehicle or automobile in such manner that the shock-pressures are always imparted to the dash-pot through the intervention of the spring, and certain important advantages thereby attained as hereinbelow explained. The invention also consists in various other features having to do with the assembly, adjustment and mode of operation as below described and as more particularly and definitely pointed out in the claims.

In the accompanying sheet of drawings, Figure 1 is a side elevation of the shock absorber. Fig. 2 is a top plan of the dash-pot with the spring removed. Fig. 3 is a longitudinal section of the dash-pot member with the spring-seat thereon. Fig. 4 is an enlarged cross-section on line IV—IV of Fig. 3. Fig. 5 is a cross-section on line V—V of Fig. 1. Fig. 6 is a perspective detail of the connection between the spring and the dash-pot.

The dash-pot consists in the present case of a cylindrical casing 1, within which is fitted a piston 2 connected by rod 3 to the ball 4 of a ball and socket joint forming the attachment to one of the parts of the vehicle between which the shock is to be suppressed, as for instance to the spring-shackle 5 of an automobile as indicated in Fig. 1. The casing is intended to contain a liquid resistance medium such as oil and is closed by a cover containing a gland or packing for the piston rod. The piston 2 is provided with ports through which the liquid may flow as the piston moves relatively within the casing and the size of these ports is subject to regulation from the exterior of the casing by means of a disk valve 7 borne on the end of a sleeve 6 on the piston rod 3, the edges of the valve disk being curved eccentrically to the axis of the piston so that rotation of the sleeve serves to close or restrict the port more or less as required. The other end of the sleeve is provided with a thread and nut thereon so arranged that the sleeve can be turned to any position desired and then firmly set in that position by screwing the nut 8 into engagement with the shoulder on the ball 4, thus locking the sleeve against accidental movement. The sleeve thus forms an external means for varying the restriction to flow past or through the interior piston, but other means may be used for the same purpose, and in fact any type of liquid dash-pot may be used according to this invention, although the form shown and the adjustment shown is preferred on account of its obvious simplicity and cheapness of cost, and in the type shown, either the casing or the piston rod may be provided with the jointed or ball and socket connection to the vehicle part.

The other member of the dash-pot, the cylindrical casing in the present case, is connected to the end of the helical spring 12 and the other end of the spring is connected to the other vehicle part, for example, to the girder frame 13, by a ball and socket joint 14, similar to the jointed connection to the spring shackle. The spring 12 is made of stiff square section steel rod and is of ample interior diameter to receive the dash-pot cylinder within it, or within its end portion which is connected to the cylinder, and such connection is made by a helically slotted collar 9 permanently secured to the cylinder by welding or otherwise, and adapted to hold the end of the spring. The latter can be screwed into the said helical slot 10 to any extent desired by rotating the casing relatively to the spring, and a set screw 11 locks the spring in the slot and to the casing in its desired adjustment and against further rotation.

It is apparent that the effective length of the spring 12 is thus susceptible of variation and also that the device as a whole may be thereby accommodated to different normal separations of the running gear and frame. It will be understood that the piston 2 holds a mid position in the cylinder when the vehicle is at rest, and is free to yield in either direction from that position. The spring-yielding part of the device, *i. e.* the spring 12, is normally free from stress, when the vehicle is at rest, but is adapted to yield in either direction, becoming thereby either distended or compressed, as the case may be. Movement of the dash-pot members can thus only occur as the result of shock energy resiliently applied to it through the said spring-yielding member and in no case can the shock movement be abruptly resisted or stopped by the dead resistance of the dash-pot liquid. On the contrary, the energy of the shock is temporarily stored in the spring and gradually transmitted in overcoming the inertia and resistance to flow of the liquid, producing an action and effect on the vehicle which is much superior to the dash-pot action alone or to operation of frictional retarding devices now commonly in use on automobiles. The superior effect occurs from the connection in tandem relation, between the spring-connected parts of the vehicle of the dash-pot and the spring-yielding members of the shock absorber, whereby the one member exerts its controlling effect on the vehicle only through the intervention of the other member. It is to be observed that the spring member 12 is a substantial and powerful spring comparable in strength to the vehicle springs and that it is constantly in action as a reservoir for a very considerable portion of the energy of every shock, thereby not only exerting its beneficial influence upon the motion of the vehicle, but also safe-guarding the dash-pot from rupture on extreme jounces.

I claim—

1. A vehicle shock absorber comprising in combination with the spring-connected parts of the vehicle, a dash-pot and spring-yielding, shock-transmitting connection means therefor, said dash-pot and means being connected with each other and with said vehicle parts in tandem relation and said spring means being adapted for resiliently yielding to shock pressures in both directions.

2. A vehicle shock absorber comprising in combination a dash-pot and spring-yielding shock transmitting means therefor, connected substantially in line with each other and with said vehicle part in tandem relation and means for varying the effective length of said spring-yielding means.

3. A vehicle shock absorber comprising in combination with the spring-connected parts of a vehicle, a longitudinally spring yielding member capable of absorbing and temporarily storing the shock pressure, connected at one end to one of said parts, and a dash-pot device having a casing and piston which are connected, respectively, to the other of said vehicle parts and to the other end of said spring yielding member.

4. A vehicle shock absorber comprising a liquid dash-pot having one of its members adapted for connection to one of the vehicle parts, a spring having means for connection to the other of the vehicle parts and adjustably connected to the remaining dash-pot member.

5. A vehicle shock absorber comprising a dash-pot having one of its members connected to one of the vehicle parts, a spring having means for connection to the other of the vehicle parts and adjustably connected to the remaining dash-pot member, said spring being concentric to the dash-pot.

6. A vehicle shock absorber comprising a cylindrical dash-pot casing concentrically disposed within a helical spring and secured thereto and means whereby the opposite end of the spring and the piston of the dash-pot may be secured to the part of the vehicle between which shock is to be suppressed.

7. A vehicle shock absorber comprising a cylindrical dash-pot casing concentrically disposed within a helical spring, means whereby said spring may be secured to the casing at different points along its own length and means whereby the opposite end of the spring and the piston of the dash-pot may be secured to the parts of the vehicle between which shock is to be suppressed.

8. In a vehicle shock absorber the combination of a helical spring and a dash-pot and means whereby the relative rotation of one of said parts with respect to the other adjusts the shock absorber to different normal positions of the parts between which the absorber is intended to be connected.

9. In a vehicle shock absorber, the combination of a liquid dash-pot member connected to one of the parts of the vehicle and a spiral spring connected to the other of said parts and to the other member of the dash-pot, the said spring being adapted to yield in both directions of relative movement between said vehicle parts.

10. In a vehicle shock absorber, a liquid dash-pot member connected to one of the parts of the vehicle and a spiral spring connected to the other of said parts and to the other member of the dash-pot, the said spring being adapted to yield in either direction of relative movement, in combination with means for adjustably restricting the liquid flow from one side of the dash-pot piston to the other and means for adjusting the effective length of the spring.

In testimony whereof, I have signed this specification.

RUSSELL S. CARTER.